United States Patent [19]

Sigler

[11] Patent Number: 4,958,919
[45] Date of Patent: Sep. 25, 1990

[54] COLOR-CORRECTED OPTICAL SYSTEMS WITH LIQUID LENS ELEMENTS

[75] Inventor: Robert D. Sigler, Cupertino, Calif.

[73] Assignee: Lockheed Missiles & Space Company, Inc., Sunnyvale, Calif.

[21] Appl. No.: 449,439

[22] Filed: Dec. 11, 1989

Related U.S. Application Data

[63] Continuation of Ser. No. 260,106, Oct. 20, 1988, abandoned.

[51] Int. Cl.⁵ ............................................... G02B 1/06
[52] U.S. Cl. ................................................... 350/418
[58] Field of Search ................. 350/418, 419, 483, 464

[56] References Cited

U.S. PATENT DOCUMENTS 1,521,563  12/1924  Pfleegor ............................... 350/418
4,762,404   8/1988  Mercado ............................... 350/483

Primary Examiner—Paul M. Dzierzynski
Attorney, Agent, or Firm—John J. Morrissey

[57] ABSTRACT

A technique is described for designing color-corrected lens systems using liquid lens elements to achieve compatibility with glass or crystal lens elements for obtaining color correction at three or more wavelengths.

7 Claims, 8 Drawing Sheets

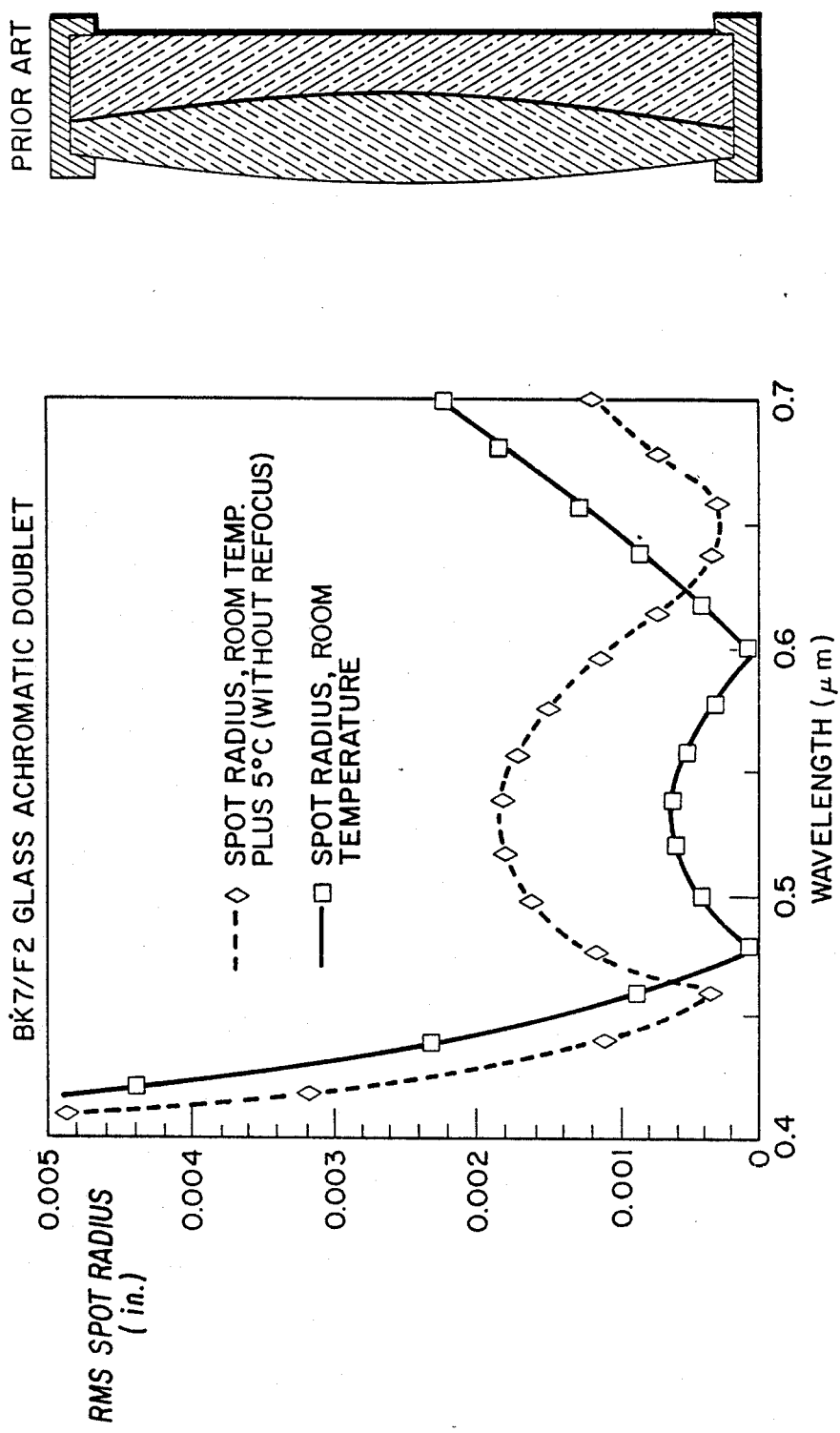

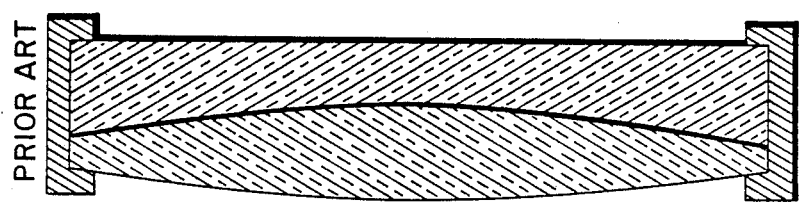
PRIOR ART
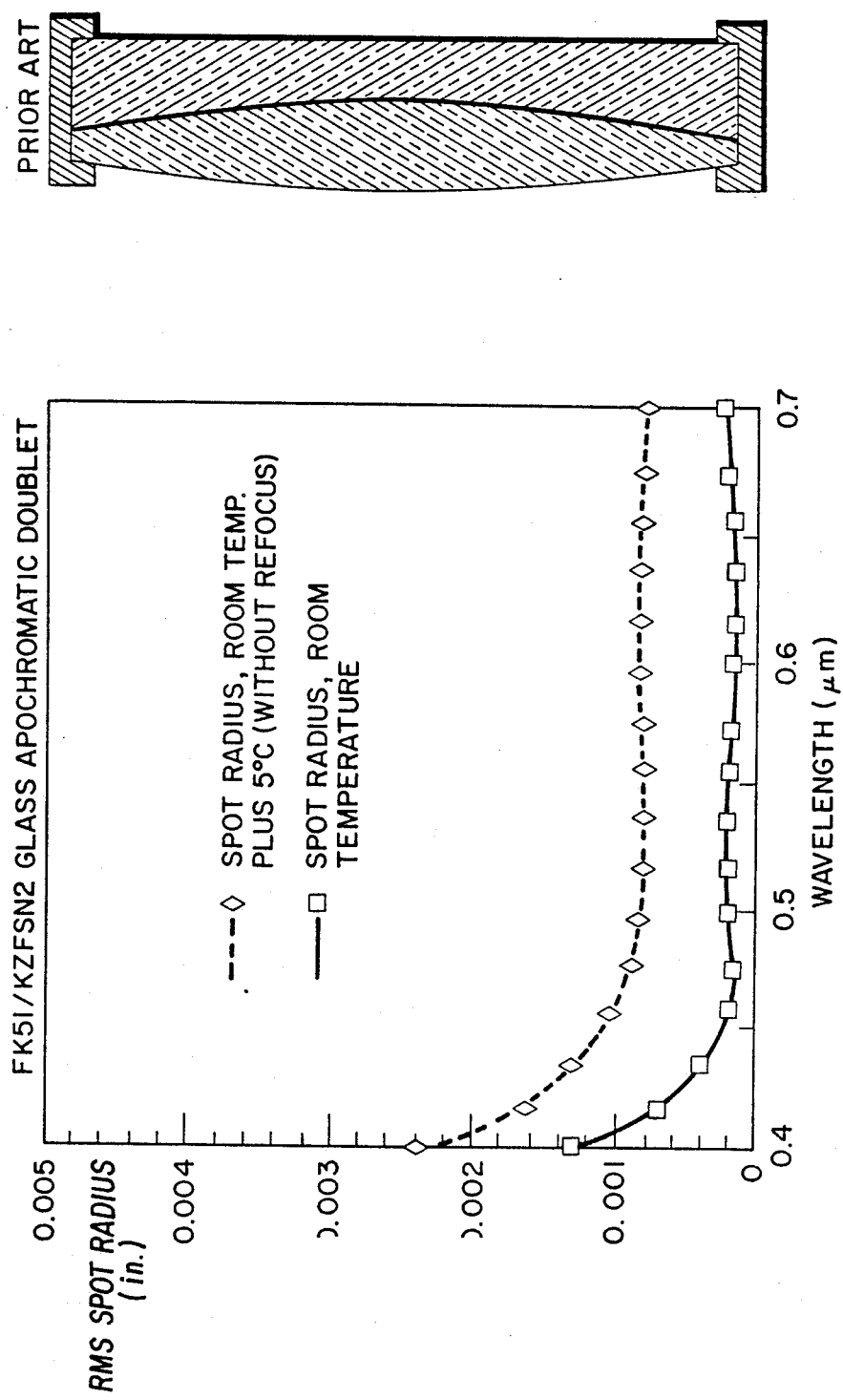
FIG_2

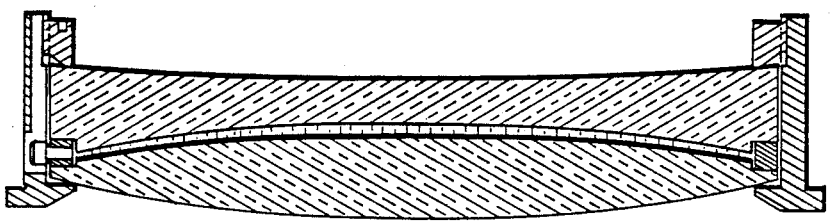
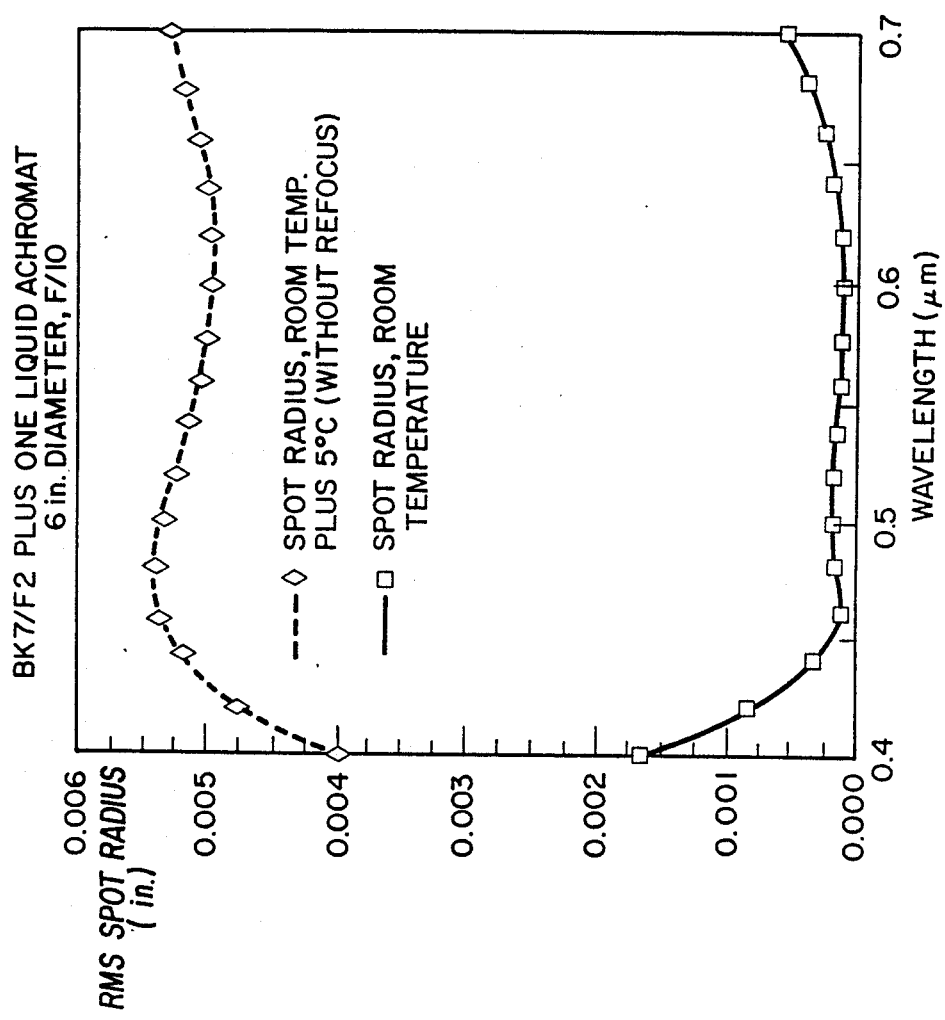
FIG_3

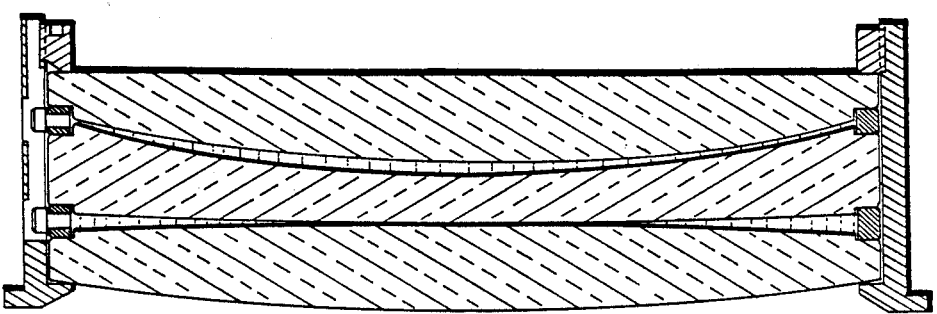
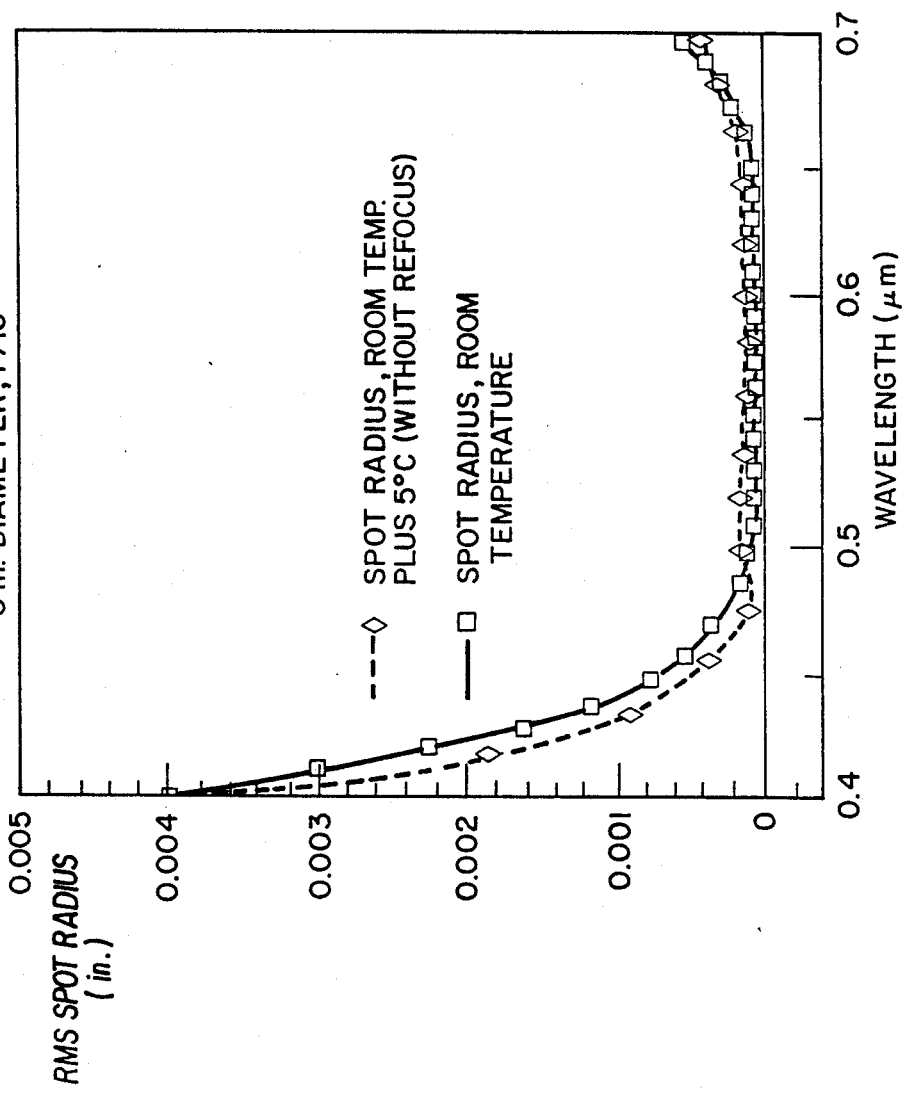
FIG_4  BK7/F2 PLUS TWO LIQUIDS APOCHROMAT
6 in. DIAMETER, F/10

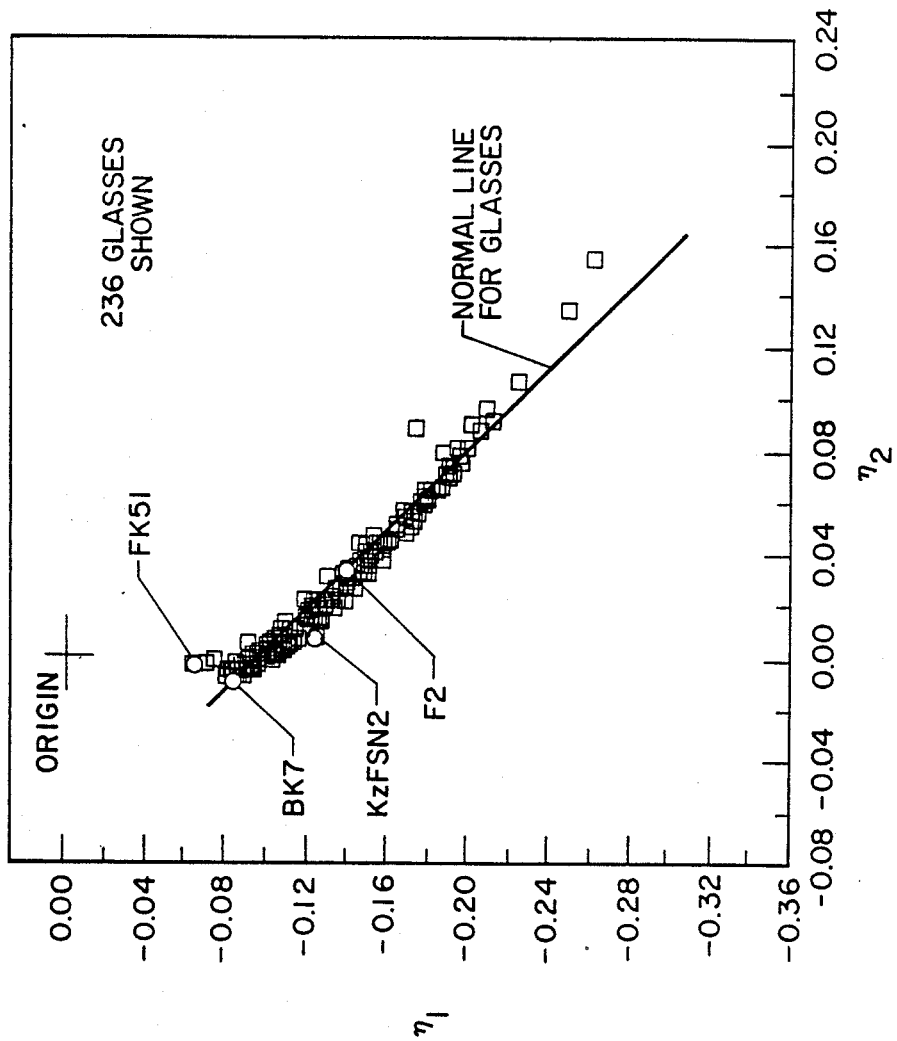
FIG_5
PRIOR ART

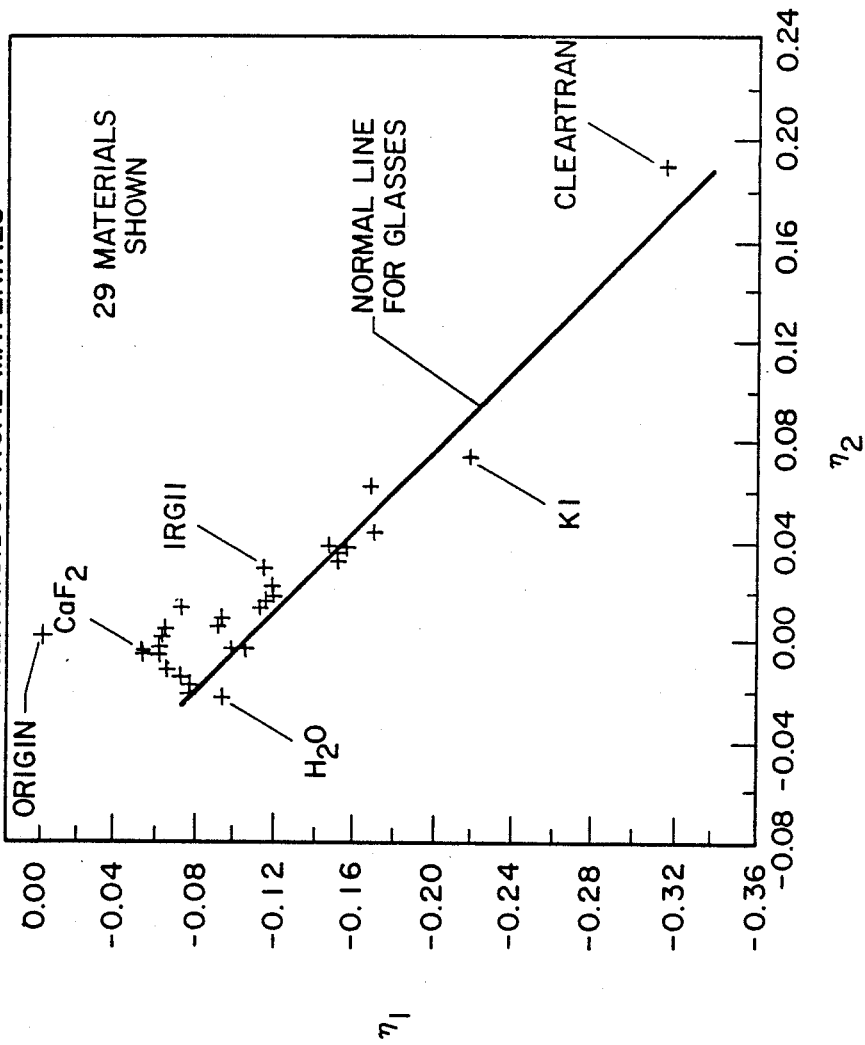
FIG_6  PRIMARY AND SECONDARY BUCHDAHL DISPERSION COEFFICIENTS OTHER RIGID OPTICAL MATERIALS

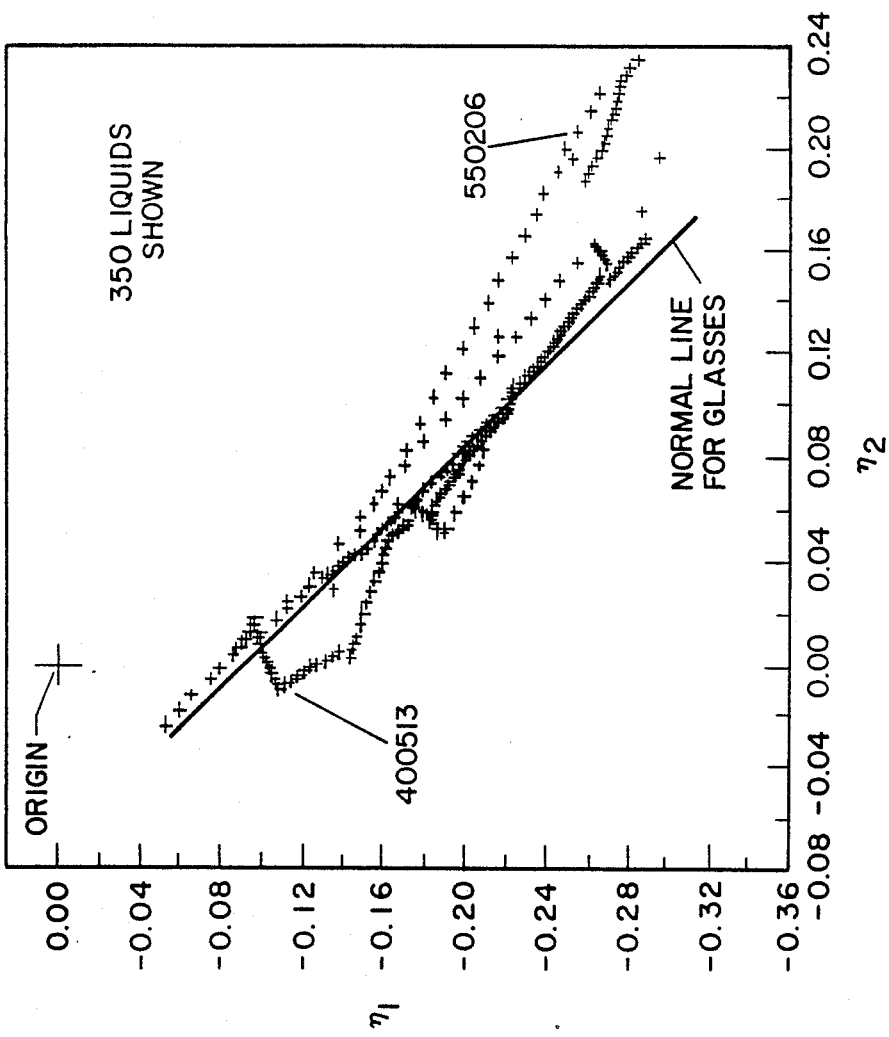
FIG_7

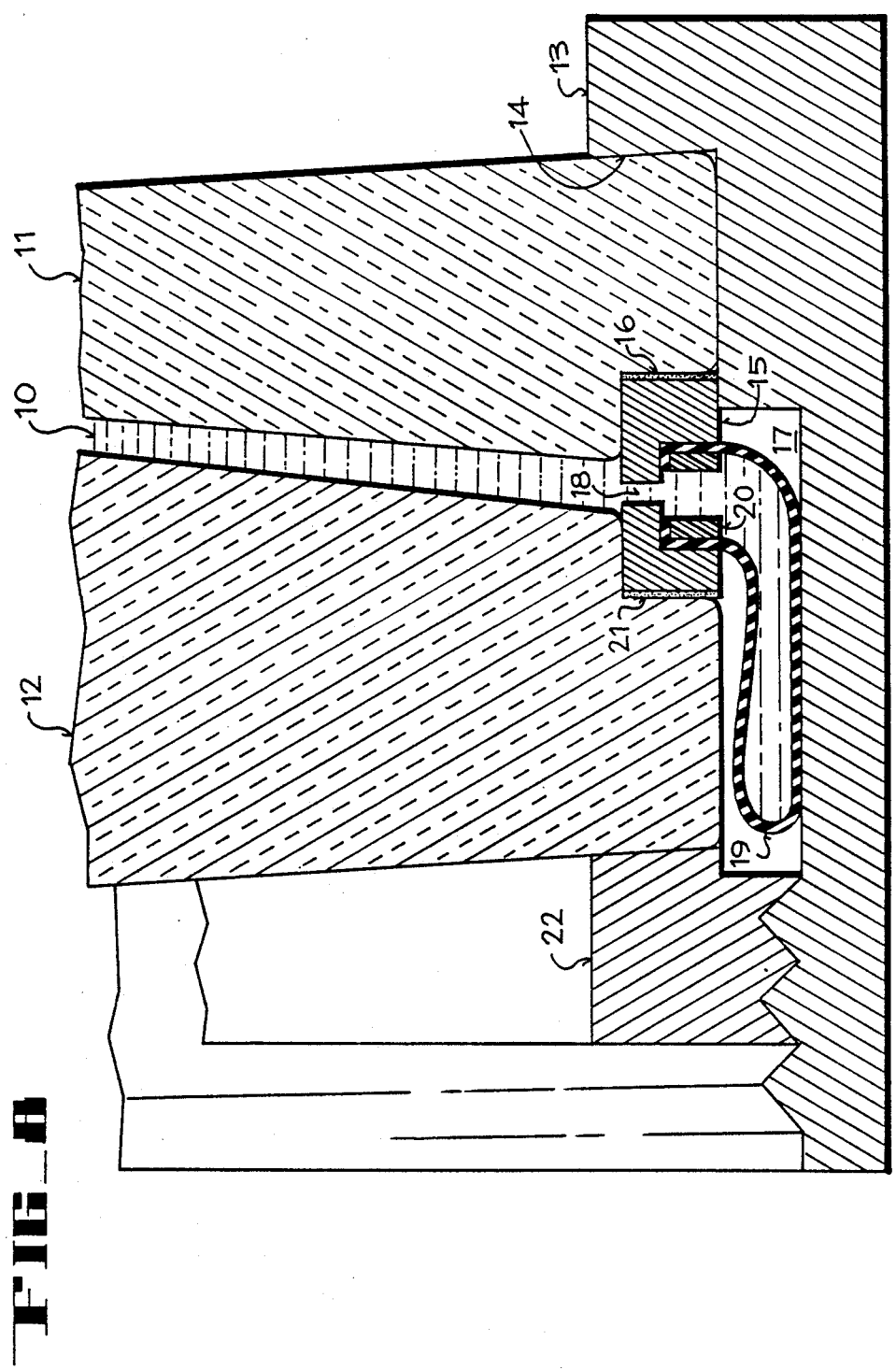

COLOR-CORRECTED OPTICAL SYSTEMS WITH LIQUID LENS ELEMENTS

This application is a continuation of application Ser. No. 260,106 filed on Oct. 20, 1988 and now abandoned.

TECHNICAL FIELD

This invention relates generally to color-corrected optical systems, and more particularly to color-corrected lens systems having liquid lens elements.

BACKGROUND OF THE INVENTION

A lens system is said to be "color-corrected" for a specified number of wavelengths, if paraxial marginal rays passing through the system are brought to a common focus on the optic axis of the system for that specified number of wavelengths. Axial chromatic aberration in the lens system is zero at the wavelengths for which "color correction" is achieved, i.e., at the wavelengths for which paraxial marginal rays are brought to the common focus.

A lens system that has zero axial chromatic aberration at two wavelengths is said to be color-corrected for those two wavelengths, and is called an "achromatic" system. A lens system that has zero axial chromatic aberration at three wavelengths is said to be color-corrected for those three wavelengths, and is called an "apochromatic" system. It is customary to speak of a "three-color" system, or a "four-color" system, or a "five-color" system, etc., when referring to a lens system that is color-corrected for three wavelengths, or four wavelengths, or five wavelengths, etc.

A lens system that is color-corrected for a specified number of wavelengths can be designed using a desired number of different kinds of optical materials (even as few as only two different kinds of optical materials) for the lens elements comprising the system, provided that the dispersion properties of the different kinds of optical materials selected for the lens elements of the system are related to each other. In such a way that zero axial chromatic aberration in the system is possible at the specified number of wavelengths. If the optical materials selected for the lens elements of the system are inherently compatible with each other so as to make color correction of the system possible at the specified number of wavelengths, the lens designer must still optimize geometrical parameters (e.g., thicknesses, radii of curvature, spacings) of the lens elements in order to develop a design form (i.e., an "optical prescription") for the system that actually results in color correction at the specified number of wavelengths. However, unless compatible optical materials are selected ab initio for the lens elements of the system, no amount of effort by the designer in attempting to optimize the geometrical parameters can result in color correction of the system at the specified number of wavelengths.

The selection of compatible optical materials is a necessary condition for designing a lens system that is to be color-corrected at a desired number of wavelengths. However, it is not sufficient merely to select compatible optical materials in order to design a color-corrected lens system. The lens designer, having first selected compatible optical materials, must then develop a design form using the selected optical materials for the lens elements of the system. In general, even if compatible optical materials are used, the development of a design form for a lens system that is to be color-corrected at three or more wavelengths requires considerable creative skill. The design form for a color-corrected lens system can be of patentable merit in its own right, even if the designer knows beforehand of one or more possible combinations of optical materials that could be used for the lens elements of the system in order to achieve color correction at the desired number of wavelengths.

A technique was disclosed in co-pending U.S. patent application Ser. No. 419,705, filed on Sept. 20, 1982, for selecting compatible optical materials for use in designing an optical system that is to be color-corrected at a specified number of wavelengths. This technique involves expressing the index of refraction of each optical material available to the designer in a power series expression derived from Buchdahl's dispersion equation, and then comparing corresponding coefficients in the power series expressions for the different optical materials. In designing an optical system that is to be color-corrected at three wavelengths using only two different optical materials for the refractive elements of the system, only those optical materials can be used for which the ratios of corresponding coefficients are equal in the quadratic form of the power series expressions for their refractive indices. Similarly, only those pairs of optical materials for which the ratios of corresponding coefficients are equal in the cubic form of the power series expressions for their refractive indices can be used for the refractive elements of an optical system made of two different optical materials that is to be color-corrected at four wavelengths. Likewise, only those pairs of optical materials for which the ratios of corresponding coefficients are equal in the quartic form of the power series expressions for their refractive indices can be used for the refractive elements of an optical system made of two different optical materials that is to be color-corrected at five wavelengths.

It was shown by R. I. Mercado in an article entitled "The Design of Apochromatic Optical Systems", *SPIE*, Vol. 554, (1985), pages 217–227, that power series expressions for the refractive indices of optical materials can be derived from various other well-known dispersion equations, including those of Hartmann, Cauchy, Schmidt and Conrady. In general, regardless of how the power series expressions for the refractive indices are derived, a necessary condition for obtaining color correction of an optical system at a desired number of wavelengths using two different optical materials for the refractive elements of the system is that the ratios of corresponding coefficients in the power series expressions for the refractive indices of the two different optical materials selected by the designer must be substantially equal to each other for a specified number of terms in the power series expressions, where the specified number of terms for which the ratios of corresponding coefficients must be equal to each other is one less than the number of wavelengths for which color correction of the system is desired.

It was further shown by R. D. Sigler in an article entitled "Glass Selection for Airspaced Apochromats Using the Buchdahl Dispersion Equation", *Applied Optics*, Vol. 25, No. 23, (1986), pages 4311–4320, that the necessary condition for achieving color correction of an optical system at three wavelengths using three (or more) different optical materials for the refractive elements of the system involves a relationship between corresponding coefficients in the power series expressions for the refractive indices of the selected optical materials that is less restricted than the relationship required between corresponding coefficients in the power series expressions for the refractive indices of a selected pair of optical materials when only two different optical materials are used for the refractive elements of the system.

The coefficients in a power series expression for the index of refraction of any particular optical material at any particular wavelength in a wavelength range of interest to the designer can be determined by fitting measured values for the index of refraction (which are usually supplied by the manufacturer of the optical material) at certain specified wavelengths (usually specified Fraunhofer lines) to a curve extending throughout the wavelength range of interest. A discussion of how the coefficients in power series expressions for indices of refraction derived from Buchdahl's dispersion equation were determined for certain optical glasses was provided by P. N. Robb et al. in an article entitled "Calculations of Refractive Indices Using Buchdahl's Chromatic Coordinates", *Applied Optics*, Vol. 22, No. 8, (1983), pages 1198–1215.

Coefficients in power series expressions for the refractive indices of commercially available optical glasses at specified wavelengths can be determined with more or less accuracy, depending upon the accuracy of measured values for refractive indices supplied by the manufacturers of the optical glasses, and upon the conformity of individual batches of the glass of each type to the particular melt of the glass of that type for which the measured values of refractive indices were obtained by the manufacturer. With regard to crystals, measured values for refractive indices at various wavelengths for certain optically useful crystals have been reported in the literature, and therefore the coefficients in power series expressions for the refractive indices of such crystals can be determined with more or less accuracy depending upon the extent to which measured refractive index data are available. It is to be noted, however, that measured refractive index data for crystals are not as plentiful (and generally are not as accurate) as measured refractive index data for optical glasses. With regard to optically useful plastic materials, measured refractive index data sufficiently accurate to enable coefficients of higher-order terms in power series expressions for refractive indices to be determined by curve fitting techniques are presently available for only a few different kinds of plastic materials.

In a power series expression for the index of refraction of an optical material based upon Buchdahl's dispersion equation, the coefficient of the first term is called the primary dispersion coefficient and the coefficient of the second term is called the secondary dispersion coefficient. If the primary dispersion coefficients for all the optical materials of interest to the optical designer are plotted against the secondary dispersion coefficients for the same optical materials in a rectangular Cartesian coordinate system, a graphical distribution of points is obtained in which each point represents a corresponding optical material. This type of plot is called a Buchdahl dispersion plot, which is analogous to the well-known Herzberger partial dispersion plot in which Abbe numbers are plotted against values of partial dispersion for the optical materials of interest to the optical designer.

In the Herzberger partial dispersion plot, the distribution of points representing the optical materials of interest are clustered about a straight line called the "normal line". Those materials represented by points that lie relatively close to the normal line on the Herzberger partial dispersion plot are said to have "normal" dispersion, and those materials represented by points that lie relatively far away from the normal line are said to have "abnormal" dispersion. A mathematical correlation can be shown to exist between the Herzberger partial dispersion plot and the Buchdahl dispersion plot. Thus, in a Buchdahl dispersion plot for optical glasses, a straight line called the "normal line for glasses" can be drawn that is analogous to the "normal line" of a Herzberger partial distribution plot. Conventionally, the normal line of a Herzberger partial dispersion plot is a straight line formed by a least-squares fit through all the plotted points. However, the normal line for glasses on a Buchdahl dispersion plot for optical glasses is a straight line formed by connecting the points representing two readily available glasses known to have normal dispersion, viz., Schott BK7 glass and Schott F2 glass.

The "normal line for glasses" formed on a Buchdahl dispersion plot for optical glasses can be superimposed onto a Buchdahl dispersion plot for other optical materials. By analogy to the Herzberger partial dispersion plot, those materials represented by points that lie relatively close to the normal line for glasses on the Buchdahl dispersion plot can be said to have "normal" dispersion, and those materials represented by points that lie relatively far away from the normal line for glasses on the Buchdahl dispersion plot can be said to have "abnormal" dispersion. As has long been realized by optical designers, it is necessary in designing a lens system that is to be color-corrected at three wavelengths for at least one lens element of the system to be made of an optical material having abnormal dispersion.

Fluidal liquids have been employed for optical purposes since antiquity. As used herein, the term "fluidal liquid" refers to a liquid in the commonly understood sense of the word, i.e., a liquid-phase material that flows to assume the shape of its container. Thus, a fluidal liquid is distinguished from a "glass", which (although technically a liquid) is a rigid (i.e., non-fluidal) optical material. It is a well-known expedient in optical engineering to use a fluidal liquid as a coupling medium between rigid lens elements for "index matching", i.e., to reduce the discontinuity between the refractive indices of consecutive lens elements. Fluidal liquids have also been used for thermal control in optical applications, and as lasing media in dye lasers. However, until the present invention, there had been no realization by optical designers that fluidal liquids can be selected for use as lens elements for the purpose of providing color correction at three or more wavelengths. The use of fluidal liquid lens elements in designing three-color lens systems had not been considered as a practical possibility in the prior art, because lens designers were generally unaware that many fluidal liquids have abnormal dispersion properties.

Published data on measured values of refractive indices for fluidal liquids have generally been inadequate for determining the coefficients of higher-order terms in power series expressions for the refractive indices of optically useful fluidal liquids. Consequently, fluidal liquids have been ignored by optical designers as candidate optical materials for use in designing color-corrected optical systems. There had been no incentive in the prior art to investigate the possibility of using fluidal liquids for the purpose of designing color-corrected optical systems, because the fact that many fluidal liquids are abnormally dispersive was generally unappreciated in the prior art.

It was known in the prior art that, for most fluidal liquids, the refractive index at a specified wavelength varies to a considerable extent with temperature. Therefore, in the absence of an awareness that many fluidal liquids have abnormal dispersion properties, there was no inducement in the prior art for optical designers to investigate the practicability of using fluidal liquids (which have the disadvantage of being temperature-sensitive) in place of optical glasses (which have the advantage of being temperature-stable) for the refractive elements of optical systems not specifically requiring fluidal liquids for mechanical or thermodynamic reasons.

SUMMARY OF THE INVENTION

It is a general object of the present invention to provide a technique for designing a color-corrected optical system using a fluidal liquid for at least one refractive element of the system.

It is a more specific object of the present invention to provide a technique for designing a lens system that is color-corrected at three or more wavelengths using at least one rigid optical material (e.g., an optical glass, a crystal or a plastic material) and at least one fluidal liquid for the lens elements of the system. In a particular embodiment of the invention disclosed herein, two different types of rigid optical materials (i.e., glasses) of normal dispersion and a single type of fluidal liquid of abnormal dispersion are used for the lens elements of the system.

At the present time, there is a paucity of published refractive index data for even the most common fluidal liquids. R. L. Cargille Laboratories of Cedar Grove, N.J., which markets specialty optical liquids for applications in optical instrumentation, chemical analysis, forensics and mechanical engineering, provides "rough" refractive index data for its optical liquid products. Cargille provides the most extensive refractive index data available at the present time for fluidal liquids; but the values for refractive indices at specified wavelengths published for the Cargille liquids are only "nominal" values, because each particular Cargille liquid is blended to achieve the specified refractive indices at the specified wavelengths.

Cargille does not ordinarily provide precise refractive index measurements at specified wavelengths for individual batches produced of any particular optical liquid. As a special service, Cargille performs refractive index measurements (accurate to within 0.00005) on particular samples of its products. However, there are no measured refractive index data for Cargille liquids analogous to "melt data" provided by optical glass manufacturers for individual batches (i.e., melts) of particular types of optical glasses. The actual value of the refractive index at a specified wavelength for a particular batch of a Cargille liquid generally differs from the nominal value, because of errors inherent in the measurement technique (i.e., so-called calibration errors), and because of batch-to-batch variations in chemical composition of the liquid.

No need had been perceived in the prior art for obtaining more precise refractive index data for fluidal liquids than were provided by Cargille for its optical liquid products. However, in a research effort leading to the present invention, it was noted from published Cargille refractive index data that the dispersion properties of many Cargille liquids are "abnormal" to a greater or lesser extent. The refractive index data provided by Cargille are generally inadequate for use in designing color-corrected optical systems comprising Cargille liquids as refractive elements. However, the accuracy of the published Cargille refractive index data is sufficient to distinguish between normally and abnormally dispersive materials.

In accordance with the present invention, it was postulated that abnormally dispersive Cargille liquids (any hence also other abnormally dispersive fluidal liquids) might be compatible with conventionally used rigid optical materials (i.e., optical glasses, crystals and plastic materials) of normal dispersion in designing optical systems that are color-corrected at three or more wavelengths. To verify this postulate, it was necessary to obtain more accurate refractive index measurements for the fluidal liquids of interest. Accordingly, arrangements were made with the National Bureau of Standards and other laboratories to obtain measured values of the refractive indices of samples of selected Cargille liquids having abnormal dispersion. Refractive index measurements over a wavelength band from 0.404 micron to 1.080 micron were obtained. Several apochromatic lens systems were then designed and fabricated using lens elements made of Cargille liquids of abnormal dispersion for which the precisely measured refractive index data were obtained.

DESCRIPTION OF THE DRAWING

FIG. 1 includes a profile drawing of an achromatic lens objective consisting of two lens elements made from two different optical glasses of normal dispersion in accordance with design principles of the prior art, as well as a plot of RMS spot radius as a function of wavelength for two different temperatures.

FIG. 2 includes a profile drawing of an apochromatic lens objective consisting of two lens elements made from two different optical glasses, both of which are of abnormal dispersion, in accordance with design principles of the prior art, as well as a plot of RMS spot radius as a function of wavelength for two different temperatures.

FIG. 3 includes a profile drawing of a lens objective consisting of two glass lens elements made from two different optical glasses of normal dispersion and one fluidal liquid lens element of abnormal dispersion according to the present invention, as well as a plot of RMS spot radius as a function of wavelength for two different temperatures.

FIG. 4 includes a profile drawing of an athermal apochromatic lens objective consisting of three glass lens elements made from two different optical glasses of normal dispersion and two fluidal liquid lens elements made from two different liquids of abnormal dispersion according to the present invention, as well as a plot of RMS spot radius as a function of wavelength for two different temperatures.

FIG. 5 is a plot of primary versus secondary Buchdahl dispersion coefficients for selected Schott optical glasses.

FIG. 6 is a plot of primary versus secondary Buchdahl dispersion coefficients for selected rigid optical materials (other than the Schott optical glasses represented on the plot shown in FIG. 5) and for water.

FIG. 7 is a plot of primary versus secondary Buchdahl dispersion coefficients for selected Cargille optical liquids.

FIG. 8 is a cross-sectional view of a mounting device for retaining a fluidal liquid lens element between two glass lens elements in a lens system according to the present invention.

BEST MODE OF CARRYING OUT THE INVENTION

Illustrated in FIG. 1 is an achromatic two-glass lens doublet suitable as a telescope objective, which has been designed according to principles of the prior art. The materials used for the lens elements of the doublet shown in FIG. 1 are optical glasses of normal dispersion marketed by Schott Optical Glass Company of Duryea, Pennsylvania with catalog designations BK7 and F2. Also shown in FIG. 1 are plots of the root-mean-square (RMS) spot radius at the focal plane of the lens doublet as a function of wavelength for two different temperatures, viz., ambient room temperature and 5° C. above ambient room temperature.

The RMS spot radius of a lens system provides a measure of optical performance (i.e., imaging quality) of the lens system. For a given temperature, the variation of the RMS spot radius with wavelength for an achromatized lens system is due primarily to the effects of residual chromatic aberration (also called "secondary spectrum"). For a given wavelength, the degradation in spot size with temperature for an achromatized lens system is due primarily to the fact that changes of refractive index with respect to temperature cause focal shift and increased spherochromatism.

The lens doublet illustrated in FIG. 1, which has an aperture diameter of 6 inches and a focal ratio of f/10, is generally representative of well-corrected achromatic lens doublets of the prior art. In fact, the lens doublet illustrated in FIG. 1 indicates the limit of what can be achieved in terms of minimum spot size (and hence minimum secondary spectrum) for a lens doublet made of normally dispersive optical glasses that are readily available and relatively inexpensive, such as Schott BK7 and F2 glasses.

It is instructive to note the approximate cost in bulk of the materials used for the lens elements of the lens doublet shown in FIG. 1. Schott BK7 and F2 glasses are relatively inexpensive, and the total cost of the two lens elements comprising the doublet shown in FIG. 1 is approximately $33 in 1982 dollars. Unfortunately, cost data have not been published since 1982 in a convenient format listing all the optical glasses marketed by Schott Optical Glass Company.

The design form (or "optical prescription") for the achromatic lens doublet shown in FIG. 1 is given in tabular format as follows:

TABLE I

| Surface No. | Radius (inches) | Thickness (inches) | $N_D$ | $V_D$ | Material |
|---|---|---|---|---|---|
| 1 | 38.8648 | 0.5000 | 1.51680 | 64.17 | BK7 |
| 2 | −21.6443 | 0.0100 | | | Air |
| 3 | −21.6443 | 0.3500 | 1.62004 | 36.37 | F2 |
| 4 | −77.8923 | 59.6362 | | | Air |
| 5 | (focal surface) | | | | | where the surfaces of the lens elements comprising the doublet are numbered consecutively from left to right in accordance with optical design convention. The "radius" listed for each surface is the radius of curvature of the surface expressed in inches. The radius of curvature of a surface is said to be positive if the center of curvature of the surface lies to the right of the surface, and negative if the center of curvature of the surface lies to the left of the surface. The "thickness" listed for a given surface is the thickness of the lens element bounded on the left by the given surface, or the thickness of the gap between the given surface and the next surface to the right thereof, where the thickness is measured in inches along the optic axis of the system. Thus, as indicated in Table I, Surface No. 2 on the left lens element of the doublet shown in FIG. 1 is configured to have the same radius of curvature as Surface No. 3 on the right lens element of the doublet, but is separated therefrom by a slight air gap of 0.01 inches (which is too small to be apparent in FIG. 1, but which is indicated according to patent drafting convention by a thickened line separating the two lens elements).

The heading $N_D$ in the next column of Table I refers to the refractive index of the lens element bounded on the left by the indicated surface, where the value of the refractive index is given for the sodium D line, i.e., for a base wavelength of 0.5893 micron. The heading $V_D$ refers to the Abbe number for the particular lens element at the same base wavelength. The "material" listed in Table I for each surface refers to the type of optical material used for making the lens element bounded on the left by the indicated surface. Both of the materials used for the lens elements of the doublet illustrated in FIG. 1 (i.e., Schott BK7 glass and Schott F2 glass) are of normal dispersion.

Illustrated in FIG. 2 is a two-glass lens doublet suitable as a telescope objective, which is apochromatic (i.e., color-corrected at three wavelengths). The lens doublet of FIG. 2, which likewise has an aperture diameter of 6 inches and a focal ratio of f/10, has also been designed according to principles of the prior art. To obtain color correction at three wavelengths, a pair of abnormally dispersive optical glasses, viz., FK51 glass and KZFSN2 glass, both of which are marketed by Schott Optical Glass Company, are used for the lens elements comprising the doublet of FIG. 2.

Also shown in FIG. 2 are plots of the RMS spot radius at the focal plane as a function of wavelength for the three-color lens doublet at ambient room temperature and at 5° C. above ambient room temperature. A comparison of the corresponding RMS spot radius curves in FIGS. 1 and 2 indicates that the lens doublet of FIG. 2 not only has better color correction than the lens doublet of FIG. 1 (i.e., color correction at three rather than merely at two wavelengths, as well as reduced secondary spectrum), but also exhibits a more stable variation of spot size with respect to temperature. However, the advantages of three-color correction for the lens doublet of FIG. 2 over two-color correction for the lens doublet of FIG. 1 are obtained at a significant cost. The Schott FK51 and KZFSN2 glasses used for the lens elements of the doublet of FIG. 2 are relatively expensive. The total cost (in 1982 dollars) of the two lens elements comprising the doublet shown in FIG. 2 is approximately $640.

The magnitude of the degradation of spot size with respect to temperature is less for the three-color lens doublet of FIG. 2 than for the two-color lens doublet of FIG. 1 for most of the visible spectrum. However, for the three-color lens doublet of FIG. 2, the degradation of spot size with respect to temperature is more noticeable, because the contribution of residual chromatic aberration (i.e., secondary spectrum) to spot size degradation is much less for the three-color lens doublet of FIG. 2 than for the two-color lens doublet of FIG. 1.

The optical prescription for the apochromatic lens doublet shown in FIG. 2 is given in tabular form as follows:

TABLE II

| Surface No. | Radius (inches) | Thickness (inches) | $N_D$ | $V_D$ | Material |
|---|---|---|---|---|---|
| 1 | 34.0978 | 0.7000 | 1.48656 | 84.47 | FK51 |
| 2 | −15.2900 | 0.0100 | | | Air |
| 3 | −15.8000 | 0.3500 | 1.55836 | 54.16 | KZFSN2 |
| 4 | −86.8155 | 59.4354 | | | Air |
| 5 | (focal surface) | | | | | where the column headings and the convention for numbering the surfaces of the lens elements are the same in Table II as in Table I.

It would clearly be advantageous to be able to design lens systems that are color-corrected at three or more wavelengths using optical materials whose costs are comparable to or less than the costs of optical materials typically used at the present time in designing achromatic lens systems. In designing a lens system that is to be color-corrected at three or more wavelengths, at least one of the lens elements must be made of a material having an "abnormal" dispersion, regardless of how many different optical materials are used. Unfortunately, optical glasses having abnormal dispersion are expensive, and often have a tendency to react chemically with constituents of the atmosphere and/or require special care in grinding and polishing.

In accordance with the present invention, fluidal liquids of abnormal dispersion are used instead of optical glasses or crystals of abnormal dispersion in designing lens systems that are to be color-corrected at three or more wavelengths. The cost of fluidal liquids for use as lens elements is relatively low in comparison with the cost of optical glasses and crystals (especially the rather exotic optical glasses and crystals that have abnormal dispersion). Furthermore, fluidal liquids that do not present significant problems with respect to chemical reactivity and fabrication are readily available for use as lens elements in color-corrected optical systems.

In FIG. 3, a three-material lens triplet is illustrated in which two different optical glasses of normal dispersion and a fluidal liquid of abnormal dispersion are used according to the present invention to make the three lens elements comprising the system. The lens triplet of FIG. 3 has an aperture diameter of 6 inches and a focal ratio of f/10. The two optical glasses used are the relatively inexpensive Schott BK7 and Schott F2 glasses, and the fluidal liquid used is a Cargille liquid that is uniquely identified by the code number 550206 according to the U.S. Mil Spec system. The designation "550206" indicates the particular Cargille liquid whose index of refraction at the sodium D spectral line has the value 1.550 to the third decimal place, and whose Abbe number has the value 20.6 to the first decimal place.

The optical prescription for the three-color lens triplet shown in FIG. 3 is given in tabular format as follows:

TABLE III

| Surface No. | Radius (inches) | Thickness (inches) | $N_D$ | $V_D$ | Material |
|---|---|---|---|---|---|
| 1 | 17.615 | 0.650 | 1.5168 | 64.15 | BK7 |
| 2 | 23.491 | 0.067 | 1.5500 | 20.60 | 550206 |
| 3 | 18.072−15.952 | 0.350 | 1.6200 | 36.37 | F2 |
| 4 | 83.867−58.541 | 58.150 | | | Air |

TABLE III-continued where the surfaces of the lens elements listed in Table III are numbered consecutively from left to right according to the convention explained above for Table I. The Cargille liquid lens element is contained between the two optical glass lens elements. The bulk material cost of the lens elements specified in Table III for the triplet illustrated in FIG. 3 is approximately $47 in 1982 dollars.

The RMS spot radius at the focal plane for the lens triplet specified in Table III is plotted as a function of wavelength in FIG. 3 for ambient room temperature and for 5° C. above ambient room temperature. A comparison of the RMS spot radius curves in FIGS. 2 and 3 shows that the optical performance (i.e., the imaging quality) of the glass-liquid lens system of FIG. 3 is equal or superior to the optical performance of the all-glass lens system of FIG. 2 at room temperature. However, at 5° C. above room temperature the RMS spot radius of the glass-liquid lens system of FIG. 3 is much larger than the RMS spot radius of the all-glass lens system of FIG. 2 for the same temperature, because the Cargille liquid has greater thermal sensitivity than the Schott optical glasses.

The primary effect of the thermal sensitivity of the Cargille liquid in the glass-liquid lens system of FIG. 3 is to shift the back focal length of the lens system. However, the shift in back focal length can be accommodated (and the degradation in optical performance can be overcome.) simply by re-focussing the lens system. Over a temperature excursion range of ±20° C. from room temperature, it has been found that re-focussing can substantially restore optical performance of a lens system to its nominal performance at room temperature. Therefore, many types of optical systems that are periodically re-focussed in the course of normal operation (e.g., binoculars, telescopes and cameras) can usefully employ glass-liquid lens systems, even in applications involving modest temperature variations (i.e., temperature variations within an excursion range of ±20° C. from room temperature).

By using two different fluidal liquid lens elements in a lens system, the different thermal sensitivities of the fluidal liquids can compensate for each other so as to render the entire lens system relatively insensitive to modest uniform temperature variations. In applications in which temperature variations occur slowly with respect to time, the radial and axial thermal gradients are small so that consequent changes in refractive index are correspondingly small. Degradations in optical performance due to such slowly occurring temperature changes can therefore be effectively modelled as uniform temperature changes.

The change in optical power of a thin lens due to a uniform temperature change (ignoring small effects due to the air) is given by the equation:

$$\frac{d\phi}{dt} = \left[ \frac{dN/dt}{N_0 - 1} - \alpha \right] \phi \quad (1)$$

where $\phi$ is the lens power, N is the refractive index of the lens at a given wavelength, $N_O$ is the refractive index of the lens at the base wavelength, dN/dt is the rate of change of the refractive index with respect to temperature, and $\alpha$ is the linear coefficient of thermal expansion of the lens material. In the case of a fluidal liquid lens element that is "shaped" (i.e., contained) by adjacent glass lens elements, the value of $\alpha$ is determined by the adjacent glass lens elements. The quantity in brackets in equation (1) can be considered as an opto-thermal expansion coefficient for the lens element, because it is dependent only upon physical characteristics of the material. For an optical system comprising a series of closely spaced thin lenses, the net change in power $\phi_O$ of the system is given by the equation:

$$\phi_o \frac{d\phi_o}{dt} = \sum_{j=1}^{n} \beta_j \phi_j \quad (2)$$

where $\phi_j$ is the opto-thermal expansion coefficient of the jth lens element of the system. With a proper choice of fluidal liquids and optical glasses, the summation in equation (2) can be made to equal zero, whereby degradation in optical performance due to temperature variations can be substantially eliminated.

Opto-thermal characteristics at ambient room temperature of certain liquids are listed as follows:

TABLE IV

| Material | Density (gm/cc) | $\alpha \times 10^{-6}/°C.$ | $dN/dt \times 10^{-6}/°C.$ | $\beta \times 10^{-6}/°C.$ | Cost/lb |
|---|---|---|---|---|---|
| Schott BK7 | 2.51 | 8.3 | 3.0 | −1.3 | $11.40 |
| Schott F2 | 3.61 | 9.3 | 4.3 | −1.3 | $12.20 |
| Schott FK51 | 3.71 | 16.0 | −6.3 | −27.0 | $198.00 |
| Schott KZFSN2 | 2.56 | 5.5 | 5.1 | 4.6 | $62.60 |
| Cargille 550206 | 1.047 | | −495.0 | −906 | $72.00 |
| Cargille 400513 | 0.932 | | −397.0 | −998 | $54.54 | where the values of $\beta$ for the Cargille liquids are based upon a mean $\alpha$ value of $7.6 \times 10^{-6}/°$ C. for boundary glasses, and where the cost data are given in 1982 dollars.

In FIG. 4, a four-material apochromatic lens quintuplet according to the present invention is illustrated in which two different optical glasses and two different fluidal liquids are used to make the five lens elements comprising the system. The lens quintuplet of FIG. 4 has an aperture diameter of 6 inches and a focal ratio of f/10. The two optical glasses used are Schott BK7 and Schott F2 glasses, and the fluidal liquids used are Cargille liquids uniquely identified by the code numbers 550206 and 400513. As explained above in connection with the lens system of FIG. 3, the designation "550206" indicates the particular Cargille liquid whose index of refraction at the sodium D line has the value 1.550 to the third decimal place, and whose Abbe number has the value 20.6 to the first decimal place. According to the same convention, the designation "400513" indicates the particular Cargille liquid whose index of refraction at the sodium D line has the value 1.400 to the third decimal place, and whose Abbe number has the value 51.3 to the first decimal place.

The optical prescription for the three-color lens quintuplet shown in FIG. 4 is given in tabular format as follows:

TABLE V

| Surface No. | Radius (inches) | Thickness (inches) | $N_D$ | $V_D$ | Material |
|---|---|---|---|---|---|
| 1 | 21.913 | 0.650 | 1.5168 | 64.17 | BK7 |
| 2 | −73.825 | 0.010 | 1.5500 | 20.60 | 550206 |
| 3 | 98.195 | 0.350 | 1.6200 | 36.37 | F2 |
| 4 | 11.005 | 0.095 | 1.4000 | 51.30 | 400513 |
| 5 | 13.864 | 0.650 | 1.5168 | 64.17 | BK7 |
| 6 | 341.878 | 56.524 | | | Air |
| 7 | (focal surface) | | | | | where the surfaces of the lens elements listed in Table V are numbered consecutively from left to right according to the convention explained above for Table I. In the lens quintuplet of FIG. 4, each Cargille liquid lens element is contained between a pair of glass lens elements. The bulk material cost of the five lens elements specified in Table V is approximately $64 in 1982 dollars. This cost is only slightly greater than the cost of the all-glass achromat of FIG. 1, and is less by a factor of 10 than the cost of the all-glass apochromat of FIG. 2, yet (as indicated by the RMS spot radius curves in FIG. 4) the apochromat of FIG. 4 is clearly superior to the apochromat of FIG. 2 in optical performance and has the additional advantage of being substantially unaffected by temperature changes.

FIG. 5 is a Buchdahl dispersion plot in which the primary and secondary dispersion coefficients (i.e., the coefficients $\eta_1$ and $\eta_2$ of the first two terms in the power series expression for refractive index derived from Buchdahl's dispersion equation) for each of 236 different Schott optical glasses are plotted as coordinates on an orthogonal Cartesian coordinate system. A straight line drawn arbitrarily through the points representing Schott BK7 glass and Schott F2 glass on the plot shown in FIG. 5 is called the "normal line for glasses". Because of a mathematical correlation between the Buchdahl dispersion plot and the Herzberger partial dispersion plot, glasses represented by points lying relatively close to the normal line for glasses in FIG. 5 have normal dispersion, and glasses represented by points lying relatively far away from the normal line for glasses in FIG. 5 have abnormal dispersion.

In FIG. 6, values of the primary and secondary Buchdahl dispersion coefficients $\eta_1$ and $\eta_2$ are plotted as coordinates of points representing water and a sampling of 28 rigid optical materials other than the Schott optical glasses represented in FIG. 5. Included among the rigid optical materials represented by points on the plot shown in FIG. 6 are crystalline materials such as calcium fluoride ($CaF_2$) and potassium iodide (KI), plastic materials such as Cleartran marketed by CVD Inc. of Woburn, Massachusetts, and other types of optical glasses such as an infrared transmissive glass marketed by Schott Optical Glass Company under the catalog designation IRG11. In FIG. 7, the values for $\eta_1$ and $\eta_2$ are plotted as coordinates of points representing a broad selection of Cargille liquids. Points are shown in FIG. 7 for 350 different optical liquids. The normal line for glasses as shown in FIG. 5 is superimposed upon the plots in FIGS. 6 and 7 to indicate the extent to which some of the materials represented in FIGS. 6 and 7 (particularly some of the Cargille liquids represented in FIG. 7) are abnormally dispersive. From the distribution of points in FIG. 7, it is apparent that a large number of Cargille liquids have abnormal dispersion.

In accordance with the disclosure in U.S. patent application Ser. No. 419,705, a pair of compatible optical materials can be selected for use in designing an optical system that is to be color-corrected at three wavelengths by:
(a) Choosing a first optical material, and locating the point ($\eta_1$, $\eta_2$) representing that first optical material on the coordinate system shown in FIG. 5;
(b) Drawing a straight line through the origin (0, 0) of the coordinate system and through the point representing the first optical material; and
(c) Selecting a second optical material from among the various optical materials represented by points lying substantially on (or immediately adjacent) the straight line drawn through the origin and through the point representing the first optical material.

The first and second optical materials selected by this technique are represented by points that are substantially collinear with each other and with the origin of the coordinate system in FIG. 5. Ordinarily, the selected first and second optical materials would be a pair of materials whose points are relatively far apart from each other on the line through the origin in order to obtain favorable lens power distributions as discussed in U.S. patent application Ser. No. 419,705.

When three or more compatible optical materials are to be selected for use in designing an optical system that is to be color-corrected at three or more wavelengths, the procedure described in the aforecited publication by R. D. Sigler, *Applied Optics*, Vol 25, No. 23 (1986), for selecting optical materials can be used. That procedure, which is more flexible in its material requirements but more complex to explain than the procedure described in U.S. patent application Ser. No. 419,705 for selecting two compatible optical materials, was used for selecting the optical materials for the embodiments of the present invention illustrated in FIGS. 3 and 4.

It is an interesting exercise to draw a straight line through the origin and through any selected "first" glass in the plot shown in FIG. 5, and then to count the number of other glasses lying on (or immediately adjacent) that line which are available for selection as the second. glass of a pair of glasses for use in designing an optical system that is to be color-corrected at three wavelengths. This exercise demonstrates of FIG. 3, the designation "550206" indicates the particular Cargille that, for any selected "first" glass, the number of available glasses from which the "second" glass can be selected is rather limited.

Even if the points representing the other rigid optical materials on the plot shown in FIG. 6 were to be added to the plot shown in FIG. 5, the number of possible materials from which a "second" material could be selected for use with any chosen "first" material would still be quite limited, because most of the materials represented on such a plot obtained by combining FIGS. 5 and 6 would still be clustered in the vicinity of the normal line for glasses. However, if the points representing the Cargille liquids on the plot shown in FIG. 7 were to be added to the plot shown in FIG. 5, the number of possible materials from which the "second" material could be selected for use with any chosen "first" material would be significantly increased, because a large number of Cargille liquids are located relatively far away from the normal line for glasses.

If the points representing the Cargille liquids in FIG. 7 were to be added to the points representing the Schott glasses in FIG. 5, a straight line drawn through the origin and through a point representing a relatively inexpensive "first" glass such as Schott BK7 glass would also pass through (or in the close vicinity of) a number of Cargille liquids. Similarly, if Cargille liquids were to be included among the available materials from which three different compatible materials are to be chosen for use in designing an optical system that is to be color-corrected at three or more wavelengths, the number of possible combinations of three different compatible optical materials available to the designer would be greatly increased because of the abnormal dispersion of many Cargille liquids.

In general, liquids can be readily blended to achieve desired dispersion properties. Consequently, for any chosen "first" glass, a liquid can (in principle) be tailor-made to have appropriate dispersion properties for use as a "second" material in combination with the "first" glass to achieve color-correction at three wavelengths.

In FIG. 8, a mounting device is illustrated for retaining a fluidal liquid lens element 10 between two glass lens elements 11 and 12 of a lens triplet according to the present invention. The mounting device comprises a hollow cell 13 having a cylindrical interior whose diameter is dimensioned to receive the glass lens elements 11 and 12 with a tight fit in coaxial disposition. The glass lens element 11 is inserted into the interior of the cell 13 so that an annular peripheral portion of one surface (i.e., the right-facing surface in FIG. 8) of the glass lens element 11 bears against an inwardly flanged lip portion 14 at one end of the cell 13. Then, a ring 15 (preferably of stainless steel), which has a cylindrical outer surface configured to be received within the interior of the cell 13 with a tight fit, is inserted into the cell 13 to bear against a cut-out annular peripheral portion of an obverse surface (i.e., the left-facing surface in FIG. 8) of the glass lens element 11. The ring 15 is preferably bonded to the cut-out annular peripheral portion of the obverse surface of the lens element 11 by means of a bonding material 16.

A recess 17 is provided on an interior surface portion of the cell 13, and a portion of the cylindrical outer surface of the ring 15 faces the recess 17. A channel 18 extends radially through an arc segment of the ring 15 to provide communication between a region of the interior of the cell 13 surrounded by the ring 15 and the recess 17 outside the ring 15. The channel 18 is configured to receive an open end of an elastic bladder 19, which is positioned within the recess 17. A washer 20, which is positioned within the bladder 19 adjacent the open end thereof, secures the open end of the bladder 19 within the channel 18 with a liquid-tight fit. A liquid passing through the channel 18 from the interior region of the cell 13 surrounded by the ring 15 into the recess 17 outside the ring 15 is confined to the bladder 19. The bladder 19 is expandable, and when unexpanded occupies a volume smaller than the volume of the recess 17. Thus, the bladder 19 can expand within the recess 17 in response to an increase in volume of liquid passed into the bladder 19 through the channel 18.

The glass lens element 12 is then inserted into the cell 13 so that a cut-out annular peripheral portion of one surface (i.e., the right-facing surface in FIG. 8) of the glass lens element 12 bears against the ring 15. The cut-out annular peripheral portion of the surface of the lens element 12 is preferably bonded to the ring 15 by means of a bonding material 21. The other end of the cell 13 (i.e., the end opposite the inwardly flanged lip portion 14) has a screw-threaded interior surface portion, which extends to the vicinity of the recess 17. A cylindrical retaining member 22, which has a screw-threaded exterior surface that engages the screw-threaded interior surface portion of the cell 13, is then inserted coaxially into the interior of the cell 13 so as to bear against an annular peripheral portion on the other surface (i.e., the left-facing surface in FIG. 8) of the glass lens element 12.

The ring 15 separates the glass lens element 12 from the glass lens element 11, and provides a cavity therebetween in which liquid is contained to form the fluidal liquid lens element 10. The liquid comprising the fluidal liquid lens element 10 can be injected by means of a syringe into the cavity between the glass lens elements 11 and 12 via a properly positioned hole through the cell 13. The hole (not shown in FIG. 8) through which the liquid is injected can be permanently sealed, as by soldering, after injection of the liquid has been completed. Thermal expansion of the liquid comprising the fluidal liquid lens element 10 is accommodated by corresponding expansion of the bladder 19.

This invention has been described above in terms of particular lens systems designed using particular optical materials, which enable color correction to be achieved at three wavelengths. However, other embodiments of color-corrected optical systems could be designed using fluidal liquids as refractive elements according to the technique disclosed herein. Hence, the particular embodiments described above are to be understood as merely illustrative of the invention, which is defined more generally by the following claims and their equivalents.

I claim:

1. A color-corrected optical system comprising a plurality of refractive elements, a first one of said refractive elements consisting of a substantially rigid optical material, a second one of said refractive elements consisting of a substantially fluidal optical material, said optical materials including at least one material having a substantially normal dispersion and at least one material having a substantially abnormal dispersion, said optical materials being compatible with each other so as to enable color correction to be achieved for at least three wavelengths.

2. The optical system of claim 1 wherein said refractive elements are lens elements, said lens elements being configured and positioned coaxially with respect to each other so that paraxial marginal rays passing through said system are brought to a common focus for at least three wavelengths.

3. The optical system of claim 2 wherein said first one of said refractive elements is made of an optical glass having a substantially normal dispersion.

4. The optical system of claim 3 wherein said refractive elements comprise a lens element made of Schott BK7 glass, a lens element made of Schott F2 glass and a lens element made of a Cargille liquid.

5. The optical system of claim 4 comprising two lens elements made of Cargille liquids, said Cargille liquids being uniquely identified by the code designations 550206 and 400513, said system having a design form as follows:

| Surface No. | Radius (inches) | Thickness (inches) | $N_D$ | $V_D$ | Material |
|---|---|---|---|---|---|
| 1 | 21.913 | 0.065 | 1.5168 | 64.17 | BK7 |
| 2 | −73.825 | 0.010 | 1.5500 | 20.60 | 550206 |
| 3 | 98.195 | 0.350 | 1.6200 | 36.37 | F2 |
| 4 | 11.005 | 0.095 | 1.4000 | 51.30 | 400513 |
| 5 | 13.864 | 0.650 | 1.5168 | 64.17 | BK7 |
| 6 | 341.878 | 56.524 | | | Air |
| 7 | (focal surface) | | | | |

6. A mounting device for a lens system comprising a fluidal liquid lens element contained between a first rigid lens element and a second rigid lens element, said fluidal liquid lens element being shaped by said first and second rigid lens elements, said mounting device comprising:
   (a) a hollow cell having an interior surface of open-ended generally cylindrical configuration, an inwardly projecting lip portion of said cell being dimensioned so that a peripheral portion of an outwardly facing surface of said first rigid lens element bears against said lip portion, said interior surface of said cell having a recessed portion;
   (b) a ring of generally cylindrical configuration, said ring being dimensioned to fit tightly against said interior surface of said cell and to bear against a peripheral portion of an inwardly facing surface of said first rigid lens element when an outer surface portion of said ring faces said recessed portion of said interior surface of said cell, said ring having a channelled segment to enable liquid to pass from a region within said cell surrounded by said ring into said recessed portion of said interior surface of said cell outside said ring;
   (c) an expandable bladder positioned within said recessed portion of said interior surface of said cell, an open end of said bladder being secured to said channelled segment of said ring to receive liquid passing from said region within said cell surrounded by said ring into said recessed portion of said interior surface of said cell outside said ring; and
   (d) means for retaining said second rigid lens element within said cell so that a peripheral portion of an inwardly facing surface of said second rigid lens element bears against said ring, said second rigid lens element being separated from said first rigid lens element by said ring, thereby defining a cavity between said first and second rigid lens elements, said fluidal liquid lens element being contained within said cavity between said first and second rigid lens elements.

7. The mounting device of claim 6 wherein a portion of said interior surface of said cell is screw-threaded and wherein said means for retaining said second rigid lens element within said cell comprises a cylindrical retaining member having a screw-threaded outer surface that engages said screw-threaded interior surface of said cell to retain said second rigid lens element against said ring.

* * * * *